United States Patent
Hackeloeer et al.

(10) Patent No.: US 11,933,618 B2
(45) Date of Patent: Mar. 19, 2024

(54) DETERMINING A ROUTE ON A MAP THROUGH TRACE MATCHING WITH A CORRESPONDING ROUTE ON ANOTHER MAP

(71) Applicant: BAYERISCHE MOTOREN WERKE AKTIENGESELLSCHAFT, Munich (DE)

(72) Inventors: Andreas Hackeloeer, Munich (DE); Stefan Holder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/136,094

(22) Filed: Dec. 29, 2020

(65) Prior Publication Data

US 2021/0223060 A1 Jul. 22, 2021

(30) Foreign Application Priority Data

Jan. 22, 2020 (DE) .................. 102020101445.7

(51) Int. Cl.
| | |
|---|---|
| *G01C 21/36* | (2006.01) |
| *G01C 21/30* | (2006.01) |
| *G01C 21/34* | (2006.01) |
| *G06F 18/20* | (2023.01) |

(52) U.S. Cl.
CPC ......... *G01C 21/3446* (2013.01); *G01C 21/30* (2013.01); *G01C 21/3635* (2013.01); *G01C 21/3676* (2013.01); *G06F 18/295* (2023.01)

(58) Field of Classification Search
CPC ............... G01C 21/3676; G01C 21/30; G01C 21/3446; G01C 21/3635; G06K 9/6297
See application file for complete search history.

(56) References Cited

U.S. PATENT DOCUMENTS

| | | | |
|---|---|---|---|
| 2008/0046174 A1 | 2/2008 | Johnson | |
| 2015/0354973 A1* | 12/2015 | Wang | G06V 10/426 |
| | | | 701/410 |
| 2018/0315240 A1* | 11/2018 | Yoshida | G06V 20/58 |
| 2019/0384294 A1* | 12/2019 | Shashua | G06V 20/584 |
| 2020/0049512 A1* | 2/2020 | Milici | G01C 21/3841 |
| 2020/0256681 A1* | 8/2020 | Kim | G09B 29/00 |
| 2020/0348145 A1* | 11/2020 | Paranjpe | G01C 21/367 |
| 2022/0011118 A1* | 1/2022 | Beggel | G06N 7/01 |

FOREIGN PATENT DOCUMENTS

| | | | | |
|---|---|---|---|---|
| CN | 106595680 A * | 4/2017 | ............ | G01C 21/30 |
| DE | 19859080 C1 | 8/2000 | | |
| DE | 10229534 A1 | 1/2004 | | |
| DE | 202015009396 U1 | 10/2017 | | |
| DE | 102018204293 A1 | 9/2019 | | |

OTHER PUBLICATIONS

English Translation of CN-106595680-A.*

* cited by examiner

*Primary Examiner* — Jess Whittington
(74) *Attorney, Agent, or Firm* — Kieran O'Leary; 2SPL Patent Attorneys PartG mbB

(57) ABSTRACT

A method of determining a first route on a first map based on a second route on a second map, comprising the steps of determining second points on the second map, the second points being included in the second route; determining first points on the first map; wherein the first points correspond in pairs to second points; and determining the first route comprising the first points by means of trace matching with respect to the second route.

19 Claims, 3 Drawing Sheets

DETERMINING A ROUTE ON A MAP THROUGH TRACE MATCHING WITH A CORRESPONDING ROUTE ON ANOTHER MAP

CROSS-REFERENCE TO RELATED APPLICATIONS

This application claims priority to German Application 10 2020 101 445.7, filed on Jan. 22, 2020. The contents of this earlier filed application is incorporated by reference herein in its entirety.

FIELD

The invention relates to the determination of a first route on a first map with respect to a predetermined second route on a second map.

BACKGROUND

A vehicle includes a navigation system configured to assist a driver in guiding the vehicle from a starting point to a destination point. In addition, an interaction system may be provided on board the vehicle, wherein the interaction system may be used by the driver to specify a destination for route guidance. A current position of the vehicle may be used as a starting point.

Maps, each of which reflects an available path network in the area of the vehicle's route, may differ between the navigation system and the interaction system. For example, the maps may be based on different geodetic systems, the maps may be of different accuracy or of different actuality. In addition, inevitable deviations from reality may be different for both maps.

To determine a first route defined with respect to a first map on the basis of a second route defined with respect to a second map, dynamic systems like AGORA-C or OpenLR, as well as static systems like TMC, VICS or GIIMME are known. Dynamic methods are usually complex and generally require access to meta-information of used track sections. Static methods use an allocation table, the size of which is practically limited so that preferably only larger and/or busy roads are supported.

One task underlying the invention is to provide the highest quality and most efficient determination of a first route on a first map on the basis of a second route on a second map. The invention solves this object by means of the subject matters of the independent claims. Subclaims represent preferred embodiments.

SUMMARY

According to a first aspect of the present invention, a method of determining a first route on a first map based on a second route on a second map comprises the steps of determining second points on the second map, the second points being included in the second route; determining first points on the first map; wherein the first points correspond in pairs to second points; and determining the first route comprising the first points by means of trace matching with respect to the second route.

It was found that trace matching may be used to convert a route from the second map to the first. No further information about an extensive path network may be used by the second map here. Thus, the method may be used with regard to any first routes on first maps. The maps used usually include geographical maps and only need to map one area each in which the mutually corresponding routes are located.

The invention may be advantageously applied in situations in which two systems or subsystems, in particular on board a vehicle, are intended to cooperate or coexist with each other and use similar but deviating geographic map data.

The second route may be given in particular in the form of a polyline. The map data may include topological, geometrical and/or semantic information, wherein working with geometrical information is preferred in this case. It is preferable to find polyline support points at locations where the route becomes ambiguous, i.e. where there are different possibilities to continue the route. Usually, support points are formed in the area of a bend, an intersection, a roundabout or a fork in a road. Such geometric support points are also known as shape points.

If the map data contain more detailed information than required, support points may be reduced, for example, by using the Douglas-Peucker algorithm. In another embodiment, the course of a road may also be represented as a spline or polynomial in geometric map data. Since the present invention examines geometric similarities, it is generally irrelevant in which form the geometric information of a map is present.

Using trace matching, a first route may be determined on the first map, the shape of which is very similar to the shape of the second route on the second map. In particular, the routes may resemble each other in their sectional curvatures or lengths. Roads and paths determined with respect to the first map may be taken into account appropriately. A wrong determination of the first route on the basis of deviations of street information between the maps may be avoided in a better way.

Trace matching is preferably performed using a Hidden Markov model. The underlying technique is well known and may easily be applied to the problem at hand by a person skilled in the art.

The first route is preferably determined in such a way that a probability according to which a sequence of first points on the first route corresponds to a sequence of second points on the second route is maximized. For this purpose, a state probability and/or a transition probability may be considered, which may respectively be determined depending on the existing mapping problem.

In one embodiment, a state probability is determined according to which a first point corresponds to a predetermined second point, and the first route is determined such that a product of state probabilities of included first points is maximized.

Here, the state probability of a second point is determined by means of a predetermined first probability function with respect to a geometric distance of the second point from the first point. The first probability function may include, for example, the normal distribution.

It is advantageous to adjust the first probability function to reflect a systematic deviation of the first from the second map. For example, the deviation may reflect a predetermined shift or predetermined tendency between the maps. Also, different underlying surveying systems may be taken into account by the probability function.

In a further embodiment, a deviation between the maps is determined and the first probability function is determined on the basis of the determined deviation. For example, the deviation may be determined on the basis of a plurality of determined first routes on the basis of predetermined second routes. The deviation may also be determined on the basis of specially selected data, for example by determining a second route that includes important traffic junctions in a predetermined geographical area. If a first route is now determined on the basis of this second route, the deviation between the maps may be determined more precisely.

In a further embodiment, a transition probability is determined according to which two consecutive first points of the first route correspond to two consecutive second points of the second route, the first route being determined such that a product of transition probabilities of included first points is maximized.

The transition probability for two subsequent first points in the first route may be determined in particular by means of a predetermined second probability function with respect to a difference between a geometric distance between second points corresponding to the first points and a shortest distance between the first points achievable on a predetermined path network of the first map. The second probability function may include, for example, an exponential distribution. The second probability function may also be adapted to a deviation between the maps.

The shortest distance between the first points achievable on the predetermined path network of the first map is again preferably determined by means of the Dijkstra algorithm. Any other algorithm for determining a shortest possible path in a graph may also be used, such as the A* algorithm, which is particularly fast when an appropriate heuristic such as a linear distance between points in the graph may be applied. In this way, the transition probability may be determined quickly and reliably in an improved way. Determination resources may be used economically.

According to a second aspect of the present invention, a device for determining a first route on a first map on the basis of a second route on a second map is configured to execute a method described herein. The device may in particular be mounted on board a vehicle, more preferably a motor vehicle.

The processing device may be configured to carry out, in whole or in part, one of the methods described herein. For this purpose, the processing device may include a programmable microcomputer or microcontroller and the method may be present in the form of a computer program product with program code means. The computer program product may also be stored on a computer-readable data carrier. Features or advantages of the method may be transferred to the device or vice versa.

The second route on the second map may be provided by a second system, wherein the first route on the first map is processed by means of a first system mounted on board a vehicle. Preferably both systems are mounted on board the vehicle. However, the first system may also be removable from the vehicle and be configured as a mobile device, for example. The first system may include a first navigation system of the vehicle which may not be configured to interact directly with a user and/or the second system may include a second navigation system which is configured to interact with the user and is also referred to herein as an interaction system. A different, in particular reversed assignment is also possible.

According to another aspect of the present invention, a system comprises a vehicle with a device described herein. Optionally, the system may include a first system mounted on board a vehicle and configured to process the first route on the first map by means of the first system. A second optional system may also be included, which is mounted on board the motor vehicle and is configured to provide the second route on the second map.

BRIEF DESCRIPTION OF THE FIGURES

The invention is now described in more detail with reference to the attached drawings in which.

DETAILED DESCRIPTION

Figure 1:
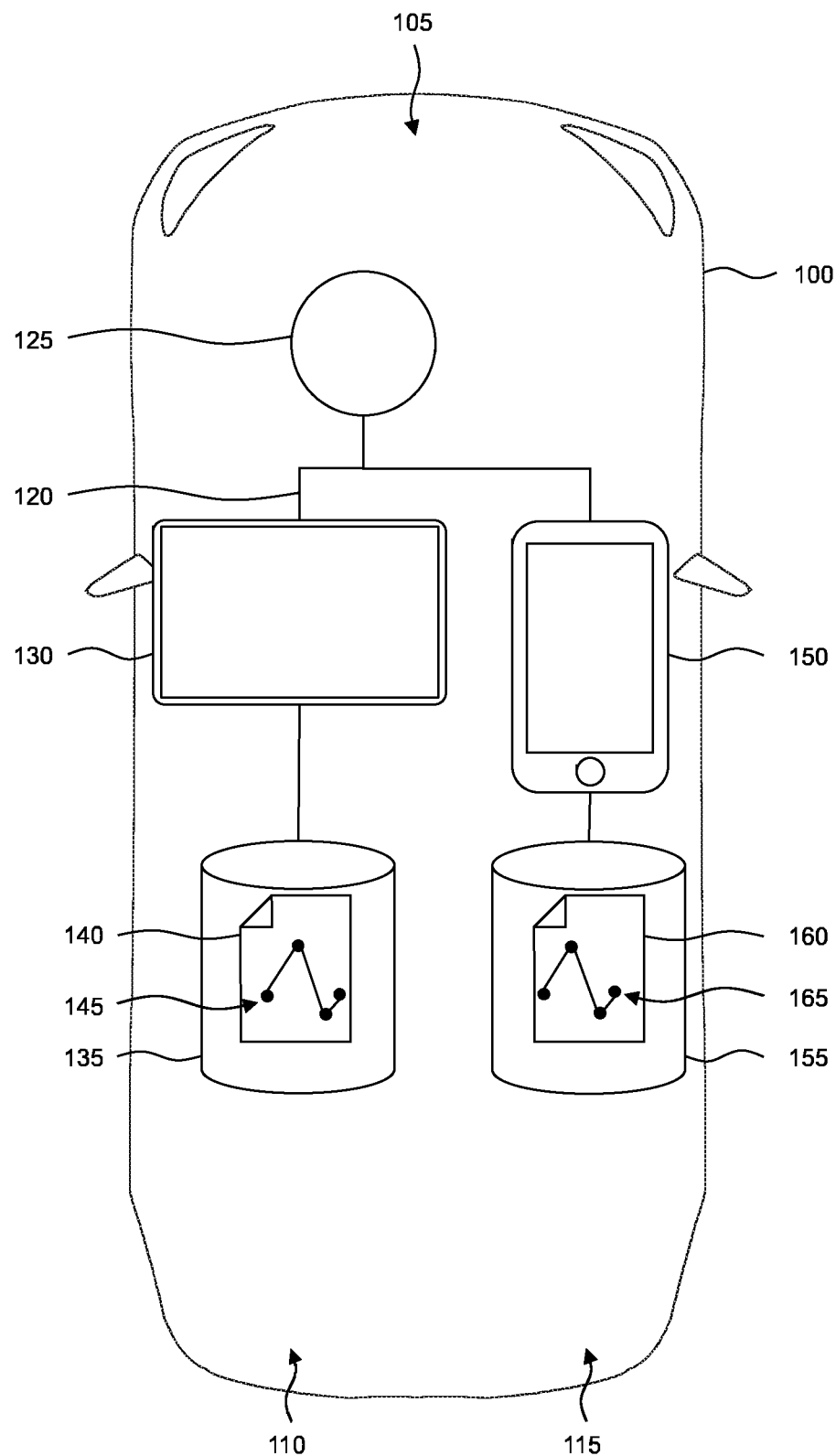
FIG. 1 illustrates a vehicle.

FIG. 1 shows a vehicle 100 with a system 105. The vehicle 100 is shown exemplarily as a passenger car, but may also include any other vehicle, powered or non-powered. The system 105 may comprise a first subsystem 110 and a second subsystem 115. Each of the subsystems 110, 115 includes associated map data, as explained in more detail below. In the present example, both subsystems 110, 115 each comprise a navigation system, wherein the first subsystem 110 may comprise an in-vehicle system that is configured, for example, for range calculation in an electric vehicle, for predicting a speed limit ("Speed Limit Information", SLI) or for a transmission advance control that shifts down before reaching a roundabout. The second subsystem 115 may be configured for direct interaction with a user, who may, for example, specify a desired destination to which he is then guided.

The first subsystem 110 is further exemplarily configured to guide the vehicle 100 to its destination in relation to a current position and a road network. For this purpose, the first subsystem 110 may include a device for determining a geographical position, for example in the form of a receiver for signals from a satellite-based navigation system. In particular, route guidance may include the provision of navigation instructions to a driver of the vehicle 100. In this case, the processing device 130 is optionally configured for interaction with a user. Preferably, at least one of the subsystems 110, 115 is permanently attached to the vehicle 100.

The second subsystem 115 is exemplarily configured for interaction with a person, in particular on board the vehicle 100, more preferably a driver of the vehicle 100. The second subsystem 115 may be configured in particular as a smartphone, tablet computer or laptop computer and may be configured to be removed from the vehicle 100. In another embodiment, the second subsystem 115 is permanently installed on board the vehicle 100. Nevertheless, the second subsystem 115 may be equipped with an operating system or application program developed for mobile devices. A communication between the subsystems 110, 115 may be established by means of a bus 120. In a further embodiment, the subsystems 110, 115 may also communicate with each other wirelessly. The System 105 may include a device 125, which is preferably communicatively connected to the two subsystems 110, 115.

The first subsystem 110 includes a first processing device 130 and preferably a first data storage 135, which includes a first map 140, with respect to which a first route 145 is determined. The second subsystem 115 includes a second processing device 150 and preferably a second data storage 155, which includes a second map 160, with respect to which a second route 165 is determined. The maps 140, 160 usually differ slightly. For example, the maps 140, 160 may be provided by different manufacturers and may include different information. For example, roads of a low road category, route bans or traffic information may be provided in only one of the maps 140, 160. Absolute positions or characteristics of landmarks or traffic junctions may deviate.

In order to transfer a route 145, 165 between subsystems 110, 115, it is proposed that the device 120 be configured to perform a conversion using a trace matcher, in particular based on a Hidden Markov model. For example, if the first route 145 is to be determined with respect to a predetermined second route 165, points of the second route 165 may represent observed states and points of the first route 145 may represent hidden states for the Markov Model.

Figure 2:
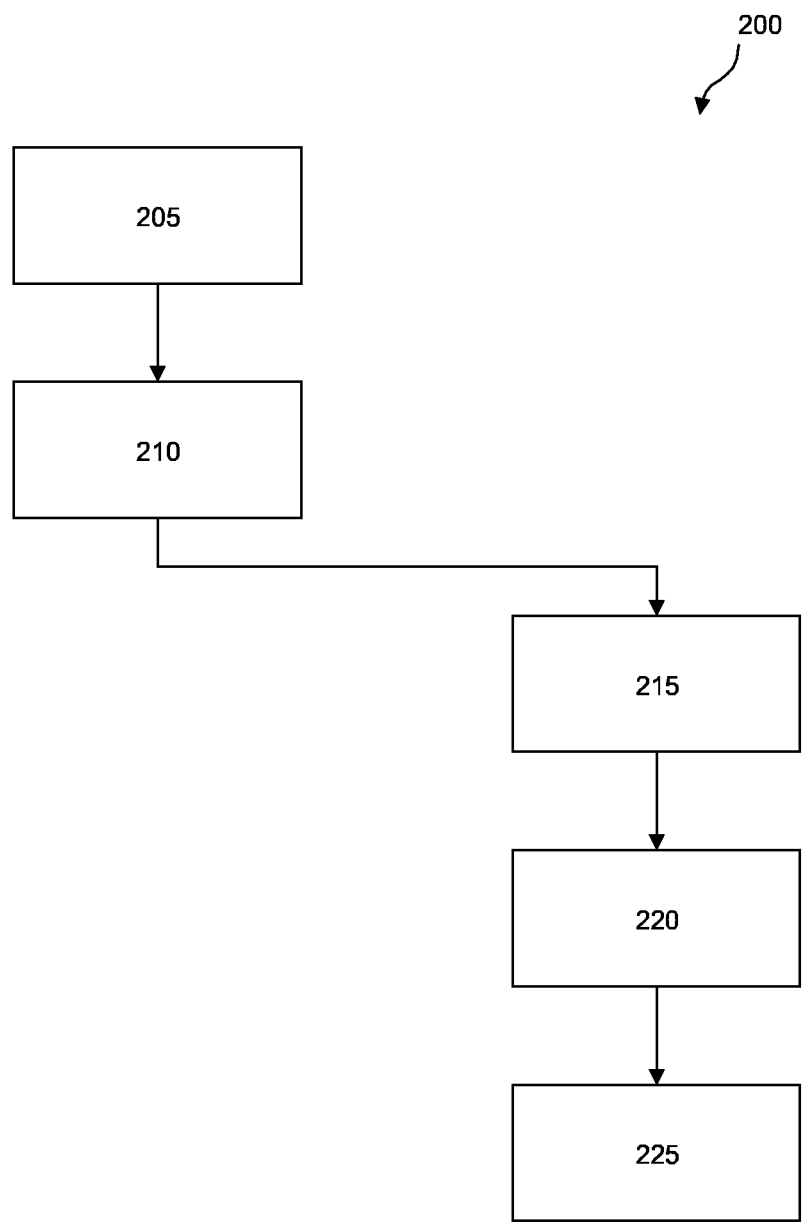
FIG. 2 illustrates a flow chart of a method.

FIG. 2 shows a flowchart of a method 200 to determine a first route 145 on a first map 140 on the basis of a second route 165 on a second map 160. The second route 165 may, for example, have been predefined by a user or determined by means of an application program with regard to the second map 160. In a step 205 the second route 165 is determined. In a step 210, points may be determined which are included in the second route 165. For this purpose, points may preferentially be chosen where the second route 165 is ambiguous with respect to the second map 160, i.e. where there are several different possibilities to continue the second route 165. For example, a point in the area of a turn, a crossing or a roundabout may be determined.

In a step 215, one or more point candidates for corresponding points on the first map 140 may be determined for each of the determined points of the second route 165. The point candidates may be searched for within a predetermined distance from the points of the second route 165 and, for example, may also designate locations where there is a choice of how to continue a route.

In a step 220 a probability may be determined for each determined point candidate according to which the point candidate corresponds to the point of the second route 165. For this purpose, a state probability may be determined, which may be determined by means of a first predetermined probability function with respect to a geometric distance of the point candidate to the point of the second route 165. The first probability function may include, for example, a normal distribution. In one embodiment, the first probability function is to be adjusted on the basis of a determined deviation of the first map 140 from the second map 160.

In addition, a transition probability may be determined according to which two consecutive point candidates on the first map 140 correspond to two consecutive points on the second map 160. The transition probability may be determined using a second predetermined probability function, which may include an exponential distribution. The transition probability may be determined using the second probability function with respect to a difference between a geometric distance between two point candidates and a shortest distance between the second points achievable on a predetermined path network of the first map 140.

In a step 225 the first route 145 may be determined on the basis of the evaluated point candidates. To determine a probability according to which a first route 145 of point candidates corresponds to the predetermined second route 165, probabilities assigned to the point candidates or transitions between the same may be multiplied with each other. A route with a maximum probability determined in this way may be determined as the first route 145.

Figure 3:
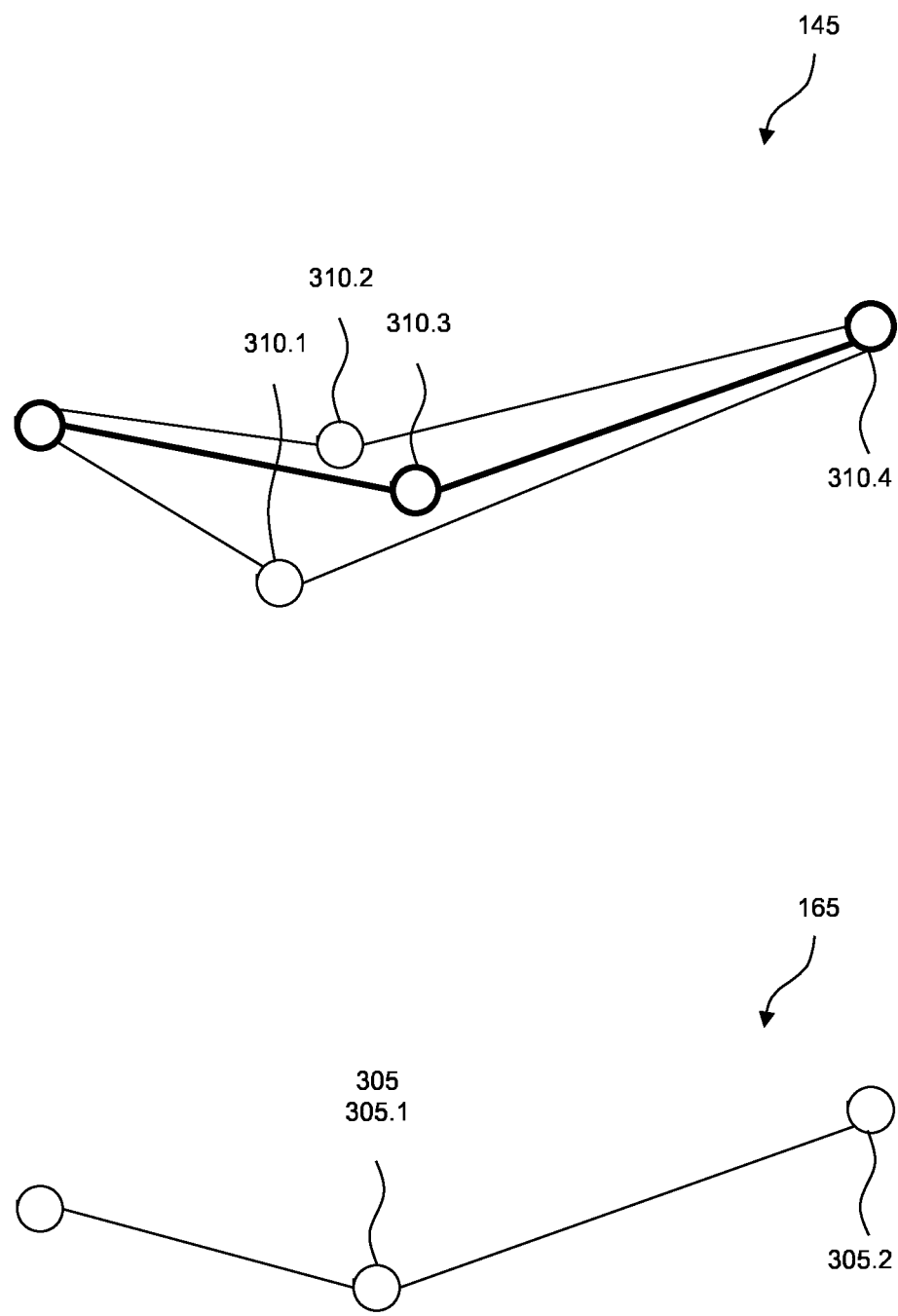
FIG. 3 illustrates exemplary first and second routes.

In the upper area, FIG. 3 shows an exemplary first route 145, which is to be determined on the basis of an exemplary second route 165 shown in the lower area. The second route 165 includes an exemplary second point 305, which is located on the second route 165 between two further points.

For a first point 310 corresponding to the second point 305, three point candidates 310.1, 310.2 and 310.3 may exemplarily be considered here.

A state probability of a point candidate 310.1, 310.2, 310.3 may be determined by inserting a respective geometric distance of the point candidates 310.1, 310.2, 310.3 each to the first point 305 into a predetermined first probability function.

In addition, for a point candidate 310.1, 310.2, 310.3 a transition probability to a point may be determined following the same in the first route 145.

By way of example, a transition probability between the point candidate 310.3 and a point candidate 310.4 that might follow the same is to be determined. It is assumed here that the point candidate 310.3 corresponds to a point 305.1 and the point candidate 310.4 to a point 305.2 on the second route 165.

First of all, a first geometric distance may be determined, denoting an achievable shortest distance between the points 305.1 and 305.2 on the first map 140. The first geometric distance is determined in relation to a road network defined in relation to the first map 140.

Furthermore, a second geometric distance may be determined, which lies between the two consecutive point candidates 310.3 and 310.4 in the first route 145.

A difference between the first and second distance may then be converted into a transition probability using a predetermined probability function, for example an exponential distribution.

REFERENCE NUMERALS

100 Vehicle
105 System
110 First subsystem (interaction system)
115 Second subsystem (navigation system)
120 Bus
125 Device
130 First processing device
135 First data storage
140 First map
145 First route
150 Second processing device
155 Second data storage
160 Second map
165 Second route
200 Method
205 Determine second route
210 Determine second points
215 Determine candidates for first points
220 Determine probabilities for candidates
225 Determine first route with highest probability
305 Second point
310 First point
310.1 Point candidate for the first point
310.2 Point candidate for the first point
310.3 Point candidate for the first point
310.4 Point candidate for the first point

What is claimed is:

1. A method for guiding a vehicle along a first route on a first map of a navigation system based on a second route on a second map of an interaction system, wherein the navigation system comprises a geographical positioning device, and wherein the first map and the second map comprise path networks in the area of the vehicle, the method comprising:
receiving the second route on the second map from the interaction system, wherein the second route is a predetermined polyline through the path network of the second map from a starting point to a destination point, the predetermined polyline further comprising a plurality of second points between the starting point and the destination point;
selecting support points on the second map,
wherein the support points comprise a subset of the plurality of second points of the second route;
determining first points on the first map;
wherein the first points correspond in pairs to the support points;
determining the first route, wherein the first route forms a polyline through the path network of the first map from the starting point to the destination point, wherein the polyline further comprising the first points between the starting point and the destination point,
characterized in that the first route is determined by means of trace matching based on a geometric similarity to the second route;
obtaining a current position of the vehicle from the geographical positioning device; and
using the navigation system to guide the vehicle along the first route in relation to the current position.

2. The method according to claim 1, wherein the trace matching is performed by means of a Hidden Markov model that determines a plurality of hidden states corresponding to a plurality of observed states, wherein the support points are input into the Hidden Markov model as the plurality of observed states, and wherein the plurality of hidden states are output from the Hidden Markov model as the first points.

3. The method according to claim 2, wherein a state probability is determined with which a first point corresponds to a support point of the support points, and the first route is determined such that a product of state probabilities of included first points is maximized.

4. The method according to claim 3, wherein the state probability of the support point is determined by means of a predetermined first probability function with respect to a geometric distance of the support point from the first point.

5. The method according to claim 4, wherein the first probability function reflects a systematic deviation of the first map from the second map.

6. The method according to claim 5, further comprising determining the systematic deviation.

7. The method according to claim 1, wherein a transition probability is determined according to which two subsequent first points correspond to two subsequent support points, and the first route is determined such that a product of transition probabilities of included first points is maximized.

8. The method according to claim 7, wherein the transition probability for two subsequent first points in the first route is determined by means of a predetermined second probability function with respect to a difference between a geometric distance between support points corresponding to the first points and a shortest distance between the first points on the path network of the first map.

9. The method according to claim 8, wherein the shortest distance between the first points on the path network of the first map is determined by means of the Dijkstra algorithm.

10. The method of claim 1, wherein the interaction system comprises a geographical positioning device and where in the starting point is a current position of the vehicle obtained from the geographical position device of the interaction system.

11. The method of claim 6, wherein the first map and the second map are geographic maps of an area of the second route wherein the systematic deviation of the first map from the second map is determined based on a measured shift between plurality of previous second routes and a plurality of previous first routes determined to correspond with the plurality of previous second routes.

12. The method of claim 1, wherein support points correspond to a point in the path network along the second route with respect to the second map where there are a plurality of possibilities to continue the second route.

13. The method of claim 1, wherein support points correspond to a turn, a bend, a crossing, an intersection, a roundabout, or a fork along the second route with respect to the second map.

14. The method of claim 1, wherein the second route is selected by a user of an interaction system of the vehicle.

15. The method of claim 1, wherein guiding the vehicle comprises using the first route to control a transmission of the vehicle.

16. A first system for guiding a vehicle along a first route on a first map of the first system based on a second route on a second map of a second system, wherein the first system comprises a geographical positioning device, and wherein the first map and the second map comprise path networks in the area of the vehicle, the first system comprising a processor to:
receive the second route on the second map from the second system, wherein the second route is a predetermined polyline through the path network of the second map from a starting point to a destination point, the predetermined polyline further comprising a plurality of second points on the path network of the second map between the starting point and the destination point;
select support points on the second map,
wherein the support points comprise a subset of the plurality of second points of the second route;
determine first points on the first map;
wherein the first points correspond in pairs to the support points;
determine the first route, wherein the first route forms a polyline through the path network of the first map from the starting point to the destination point, the polyline further comprising the first points between the starting point and the destination point,
characterized in that the first route is determined by means of trace matching based on a geometric similarity to the second route;
obtain a current position of the vehicle from the geographical positioning device; and
guide the vehicle along the first route in relation to the current position.

17. The device according to claim 16,
wherein the second system is an interaction system configured to interact with a user,
wherein the second route is predetermined by the user, and
wherein the first system is a navigation system mounted on board the vehicle.

18. A vehicle including a navigation system for guiding the vehicle along a first route on a first map of the navigation system based on a predetermined route on a second map of an interaction system, wherein the navigation system comprises a geographic positioning device, and wherein the first map and the second map comprise path networks in an area of the vehicle, the navigation system comprising a processor to:
receive the predetermined route on the second map from the interaction system, wherein the predetermined route a second polyline through the path network of the second map from a starting point to a destination point, wherein the second poly line further comprises a plurality of second points between the starting point to the destination point;
select support points on the second map,
  wherein the support points comprise a subset of the plurality of second points of the predetermined route;
determine first points on the first map;
  wherein the first points correspond in pairs to the support points; and
determine the first route on the first map, wherein the first route forms a first polyline through the path network of the first map from the starting point to the destination point, wherein the first polyline further comprises the first points between the starting point and the destination point,
  wherein the route is determined by means of trace matching based on a geometric similarity to the predetermined route;
obtain a current position of the vehicle from the geographical positioning device; and
guide the vehicle along the first route in relation to the current position.

19. The vehicle according to claim 18, wherein the interaction system is mounted on board the vehicle and configured to provide the predetermined route on the second map.

* * * * *